United States Patent [19]

Binnig

[11] E Patent Number: Re. 33,387

[45] Reissued Date of Patent: Oct. 16, 1990

[54] ATOMIC FORCE MICROSCOPE AND METHOD FOR IMAGING SURFACES WITH ATOMIC RESOLUTION

[75] Inventor: Gerd K. Binnig, Inning, Fed. Rep. of Germany

[73] Assignee: International Business Machines Corporation, Armonk, N.Y.

[21] Appl. No.: 273,354

[22] Filed: Nov. 16, 1988

Related U.S. Patent Documents

Reissue of:

[64] Patent No.: 4,724,318
Issued: Feb. 9, 1988
Appl. No.: 892,977
Filed: Aug. 4, 1986

U.S. Applications:

[63] Continuation-in-part of Ser. No. 802,123, Nov. 26, 1985, abandoned.

[51] Int. Cl.[5] ..... H01J 37/26; G01N 23/00

[52] U.S. Cl. ..... 250/306; 250/307

[58] Field of Search ..... 250/306, 307, 423 F

[56] References Cited

U.S. PATENT DOCUMENTS 4,343,993 8/1982 Binning et al. ..... 250/423 F
4,618,767 10/1986 Smith ..... 250/306
4,668,865 5/1987 Gimzewski et al. ..... 250/306

OTHER PUBLICATIONS

"Scanning Tunneling Microscope Combined with a Scanning Electron Microscope", Gerber et al., *Rev. of Sci. Ins.*, vol. 57, No. 2, Feb. 1986.

*Primary Examiner*—Bruce C. Anderson
*Attorney, Agent, or Firm*—Henry E. Otto, Jr.

[57] ABSTRACT

A sharp point (5) is brought so close to the surface of a sample (4) to be investigated that the forces occurring between the atoms at the apex of the point (5) and those at the surface cause a spring-like cantilever (7) to deflect. The cantilever (7) forms one electrode of a tunneling microscope, the other electrode being a sharp tip (8). The deflection of the cantilever (7) provokes a variation of the tunnel current, and that variation is used to generate a correction signal which can be employed to control the distance between said point (5) and the sample (4), in order, for example, to maintain the force between them constant as the point (5) is scanned across the surface of the sample (4) by means of an xyz-drive (3). In certain modes of operation, either the sample (4) or the cantilever (7) may be excited to oscillate in z-direction. If the oscillation is at the resonance frequency of the cantilever (7), the resolution is enhanced.

31 Claims, 2 Drawing Sheets

ATOMIC FORCE MICROSCOPE AND METHOD FOR IMAGING SURFACES WITH ATOMIC RESOLUTION

Matter enclosed in heavy brackets [ ] appears in the original patent but forms no part of this reissue specification; matter printed in italics indicates the additions made by reissue.

This application is a continuation-in-part of copending application Ser. No. 06/802,123, entitled "METHOD AND ATOMIC FORCE MICROSCOPE FOR IMAGING SURFACES WITH ATOMIC RESOLUTION", filed on Nov. 26, 1985, *now abandoned* in the name of G. K. Binnig.

TECHNICAL FIELD

This invention relates to a method for imaging surfaces of objects with atomic resolution, and to an atomic force microscope which employs that method.

BACKGROUND OF THE INVENTION

Conventional optical microscopes have a resolution limit which is determined by the aperture of the object lens, and a resolution better than about one-half the wavelength of the light used can principally not be achieved. In copending U.S. application, Ser. No. 06/563,722, filed Dec. 20, 1983, an optical near-field scanning microscope is disclosed which circumvents the resolution limit through the use of an aperture with an entrance pupil diameter that is small compared to the wavelength, and arranged at a distance from the object smaller than the wavelength. This microscope achieves a resolution on the order of one tenth of the wavelength, i.e., in the neighborhood of 50 nm.

Electron microscopes typically have resolutions of 20 nm vertical and 1 nm lateral, but their known disadvantage is that because of the high energies of the electron beam required in achieving a high resolution, most surfaces are severely damaged.

The scanning tunneling microscope of U.S. Pat. No. 4,343,993 operates with much smaller energies. Since its operation and structure is relevant in connection with the present invention, the brief description of the scanning tunneling microscope is in order.

A very sharp metal tip is raster-scanned across the surface to be inspected at a distance so small that the electron clouds of the atoms at the apex of the tip and on the surface area closest to the tip gently touch. A so-called tunnel current then flows across the gap provided a potential difference exists between said tip and the surface. This tunnel current happens to be exponentially dependent on the distance between tip and surface, and this phenomenon is used to generate a correction signal based on the deviations from a predetermined value occurring as the tip is scanned across the surface of the probe. The correction signal is used to control the tunnel distance so as to minimize the correction signal, and to be plotted versus a position signal derived from the physical position of the tip over the surface being inspected. This technique permits a resolution down to an atomic scale, i.e., individual atoms on a surface can be made visible.

The scanning tunneling microscope requires the existence of a potential difference across the tunnel gap. Accordingly, tunnel tip and surface to be inspected either have to consist of electrically conductive material or must be coated with such material. (An insulating surface layer thinner than the tunneling length is permissible.) Thus, the scanning tunneling microscope has a natural limitation where the surface of an insulator is to be studied. Obviously, many of its details are sacrificed if a surface must first be coated with a metal layer, however thin that layer may be.

SUMMARY OF THE INVENTION

It is, therefore, an object of the invention to describe a method for imaging the surface of any material with atomic resolution, which method does not require high energies or preparatory metal coating, and which is not limited to working with electrical conductors.

It is a further object of the invention to propose an atomic force microscope with which the inventive method can be performed. The principle underlying both the method and the microscope is based on the insight that it atoms are approached to one another so closely that their electron clouds touch (i.e., that there is a low-level overlap of the wave function of the front atom of a sharp tip with the surface atoms of the sample to be inspected), interatomic forces occur. However, these forces are extremely small and hitherto have been very difficult to measure outside a laboratory environment and at a reasonable scanning rate. This become now possible with the present invention in that the interatomic forces are employed to deflect a very small spring, and the deflections of said spring are measured with a tunneling microscope.

According to the invention, applicant's method for generating a topographical image of a sample surface with a resolution better than 100 nanometers in characterized by the following steps: A sharp point which is fixed to one end of a spring-like cantilever is brought so close to the surface of a sample to be inspected that the forces occurring between said point and the sample's surface are larger than $10^{-20}$N such that the resulting force deflects the cantilever. The deflection of the cantilever is detected by means of a tunnel tip disposed adjacent the cantilever. The tunnel current then flowing across the gap between the cantilever and tunnel tip is maintained at a constant value by using any detected variations of the tunnel current to generate a correction signal. The correction signal is used, among other things, to maintain the point-to-sample distance constant.

Applicant's atomic force microscope according to the present invention performs the method described above and comprises a sample holder designed for moving the sample in xyz-directions by steps in the nanometer range, and means including first and second tunnel electrodes and associated electronics for measuring the distance between the tunnel electrodes and generating a correction signal in response to deviations of said distance from a predetermined value. This atomic force microscope is characterized in that the sample holder is disposed opposite a sharp point fixed to one end of a spring-like cantilever. The cantilever constitutes or carries the first of the electrodes, the second tunnel electrode being movably disposed adjacent the first tunnel electrode. The correction signal is applied to the sample holder for maintaining the sample-to-point distance constant; the correction signal may be applied to a plotter connected to a source of position pulses derived from the scanning of the point across the sample's surface of depicting the contour of the sample surface.

BRIEF DESCRIPTION OF THE DRAWINGS

Details of preferred embodiments of the invention will hereafter be described, by way of example, with reference to the accompanying drawings in which.

DESCRIPTION OF THE PREFERRED EMBODIMENT

Figure 1:
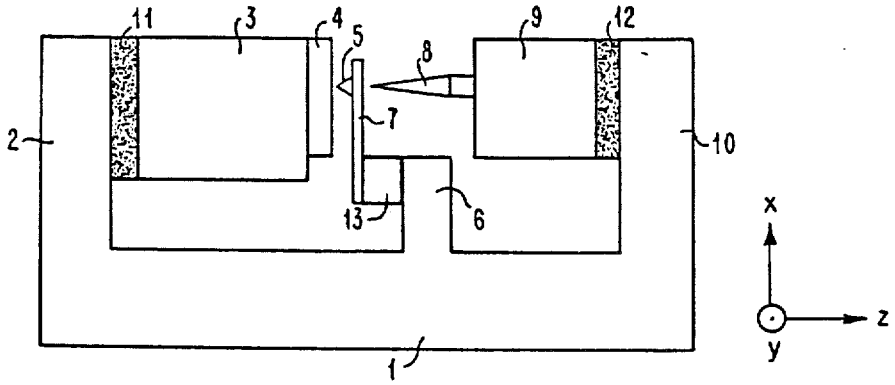
FIG. 1 illustrates the configuration of the essential parts of the atomic force microscope embodying the invention.

Referring to FIG. 1, the basic configuration of the atomic force microscope embodying the invention comprises a rigid base 1 which may, for example, consist of an aluminum block. Mounted to an arm 2 of base 1 is an xyz-drive 3 which permits a sample 4 to be displaced in x, y, and z directions with respect to a stationary point 5. Point 5 is supported on an arm 6 protruding from base 1 and carrying a cantilever which in the preferred embodiment takes the form of a leaf spring 7 with point 5 fixed to the upper end of said spring.

Facing the back of spring 7 is a tunnel tip 8 supported by a z-drive 9. Z-drive 9 permits tunnel tip 8 to advance or retract with respect to spring 7 and is supported on an arm 10 extending from base 1.

Since this instrument is intended to investigate surfaces at extreme magnifications, it is necessary to provide means for eliminating all ambient vibrations, such as building vibrations. Toward this end, cushions 11, 12 of Viton rubber separate the drives 3 and 9 from the arms 2 and 10 of base 1. (Viton is a trademark of E. I. duPont de Nemours & Co. for its brand of damping material.)

In operation, the sample 4 to be inspected is mounted on xyz-drive 3 with its surface facing point 5. When the sample 4 is moved toward point 5 to a distance where the electron clouds of the atoms at the apex of point 5 touch the electron clouds of the atoms on the surface of the sample, interatomic forces occur. These forces, which are repulsive, are on the order of $10^{-13}$N and operate to deflect spring 7, to which point 5 is fixed.

In view of the smallness of the forces occurring between individual atoms, the masses of point 5 and of spring 7 should be as small as possible. Also, to permit a large deflection, the spring should be soft, but at the same time it should be reasonably insensitive against building vibrations. The strongest frequency components of building vibrations are around 100 Hz. Thus the spring/point assembly should have an eigen frequency $f_o$ much higher than 100 Hz, and this requires a very small mass.

In one experimental embodiment, with a tiny diamond stylus arranged on the smallest of springs that could be hand-made, the mass of the point/spring assembly was about $10^{-8}$ kg and the eigen frequency was found to be 2 kHz. The spring consisted of a thin gold foil of 25 μm thickness and 0.8 mm length, and an observed deflection of 40 pm corresponds to a force on the order of $10^{-10}$N.

Spring 7 is supported on arm 6 by means of a piezoelectric element 13. Tunnel tip 8 is advanced by z-drive 9 toward spring 7 to within a preselected distance, i.e., about 0.3 nm, so that a tunnel current will flow across the gap between the spring and tip, provided a suitable potential difference exists between them. This tunnel current is exponentially dependent on the distance between the tunnel electrodes. Thus, the tunnel current is a measure of the deviation of the surface elevation at the actual location of inspection of sample 4 from a predetermined or home level.

In normal operation, the atomic force microscope according to the invention will be used for mapping a larger part of the surface: e.g., that of a semiconductor wafer or circuit board. Accordingly, point 5 is scanned across the sample in a matrix fashion. If the value of the tunnel current for each spot on the sample surface is plotted (by means not shown) versus the location information of that spot, a topographical image of the sample surface will result. The tunnel current variation resulting from the scanning of a (usually non-flat) surface is used to generate a correction signal which is applied in a feedback loop to the z-portion of xyz-drive 3 so as to control the distance between point 5 and sample 4 in such a manner that the interatomic force is maintained at a constant value.

As mentioned above, spring 7 is supported on arm 6 by means of a piezoelectric element 13. This enables oscillation of the spring in the z-direction, e.g., at its eigen frequency, in one particular mode of operation which will be described later.

Figure 2:
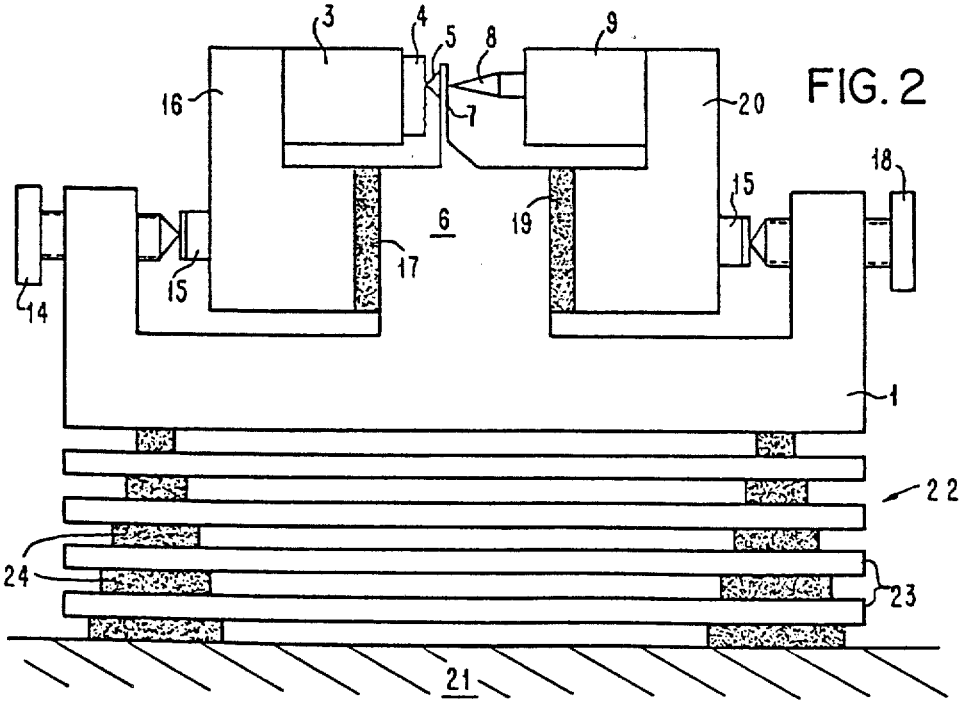
FIG. 2 illustrates a preferred embodiment of the atomic force microscope of FIG. 1.

FIG. 2 shows in more detail the preferred embodiment of the atomic force microscope of the present invention. The distance between point 5 and sample 4 is roughly adjustable by means of a screw 14 which bears against a Viton pad 15 sitting on a member 16. The latter is supported via a Viton cushion 17 by the base 1. Member 16 carries the xyz-drive 3 on which sample 4 is held. Cantilever 7 is fixed to base 1 and carries point 5, the apex of which faces sample 4. Tunnel tip 8 is rough-positioned with respect to cantilever 7 by means of a screw 18 which permits squeezing a Viton cushion 19. The fine-positioning of tunnel tip 8 is accomplished by z-drive 9 which is supported on a member 20 carried by base 1 via said Viton cushion 19. To eliminate as much as possible the ambient vibrations which might affect bench 21 on which the atomic force microscope rests, a vibration filter 22 is provided. This filter comprises a stack of metal plates 23 separated by rubber pads 24 of decreasing sizes (from the bottom up), as known from IBM Technical Disclosure Bulletin Vol. 27, No. 5, p. 3137.

Figure 3:
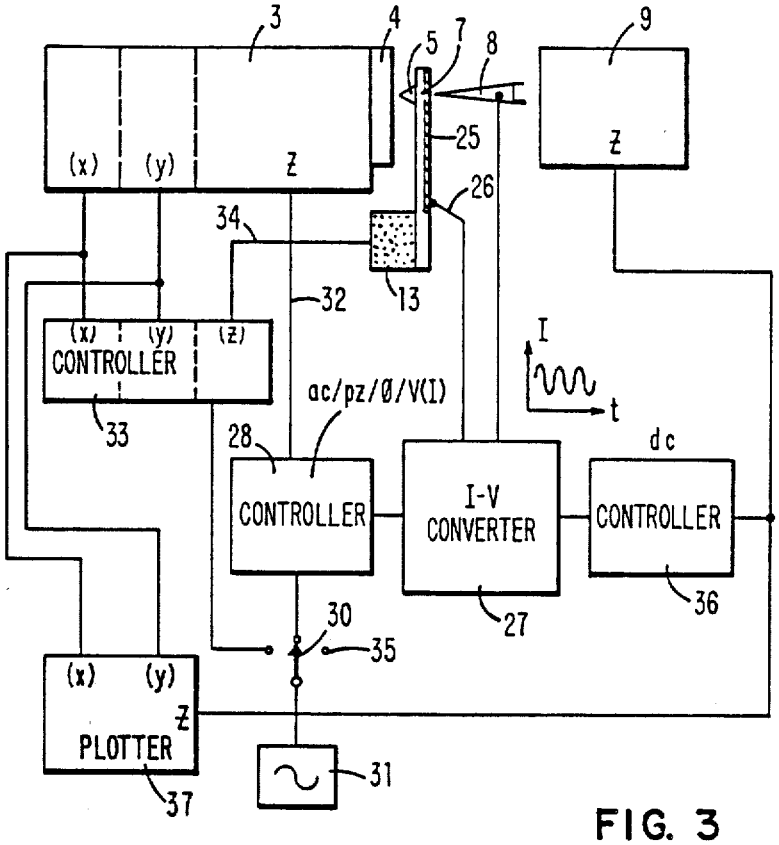
FIG. 3 depicts circuitry for permitting operation of the microscope of the present invention in a selectable one of four modes.

FIG. 3 depicts circuitry, including feedback loops that permit four different feedback modes in operating the atomic force microscope of the present invention. As illustrated, this circuitry comprises a lead 26 connecting to an I-V converter 27 an electrode associated with the side of cantilever spring 7 adjacent tunnel tip 8. converter 27 converts current into voltage to detect variations in the tunnel current. Converter 27 forms part of a feedback loop including a controller 28. Controller 28 is connected to the z-drive of the xyz-drive 3 to modulate the latter in the z direction. Controller 28 processes the voltage signal from converter 27 to remove noise and provide a signal of appropriate sign and amplitude according to a selectable one of the aforementioned feedback modes which will not be described.

Assume now that controller 28 is conditioned to operate in the first mode [ac]. In the first mode, after proper adjustment of the distances between sample 4 and point 5, and between cantilever 7 and tunnel tip 8, respectively, xyz-drive 3 is modulated to expand and retract in z-direction with an amplitude between 0.1 and 1 nanometer at the eigen frequency of cantilever 7. The interatomic force existing between the front atoms at the apex of point 5 and those on the surface of sample 4 causes cantilever 7 to oscillate. This oscillation, of course, changes the distance between cantilever 7 and tunnel tip 8, so as to modulate the tunnel current. With a switch 30 (FIG. 3) in the position in which it is shown, controller 28 is connected to a modulator 31. Controller 28 filters out the one specific frequency of the modulated tunnel current that is applied as a correction signal in line 32 to the control input of the z-section of xyz-drive 3 forcing sample 4 to be retracted.

Assume now that controller 28 is conditioned to operate in the second mode [pz]. In the second mode, switch 30 is operated to connect the modulator 31 to the z-section of a controller 33. Controller 33 controls the xyz-drive 3 in the x and y directions to scan the sample 4 in the x and y directions, and also modulates the piezoelectric element 13 in the z direction. Cantilever 8 (FIG. 1) is excited by means of piezoelectric element 13 to oscillate in z-direction with its eigen frequency at an amplitude in the 0.01 . . . 0.1 nanometer range. The interatomic force existing at the interface between point 5 and sample 4 will cause the amplitude of the oscillation of cantilever 7 to change. From this change, a correction signal can be derived in line 34.

With controller 28 conditioned to operate in the third mode [$\phi$], feedback operation is identical with the second mode, except for the fact that here the changes in phase of the cantilever's oscillation are used to derive the correction signal in line 34.

When conditioned to operate in the fourth mode [v(I)], controller 28 converts the voltage from converter 27 into at least one preselected bandwidth of frequencies, which may include the dc component. In the fourth mode which applies in situations where a small bias force is desirable or necessary, switch 30 is moved to a position 35 in which it disconnects the modulator 31 from both controllers 28 and 33. In this mode, sample 4 is slowly approached to the stationary cantilever 7 the deflection of which varies the tunnel current flowing across the gap between cantilever 7 and tunnel tip 8. Based on the variation of the tunnel current, a control signal is derived in line 32 which directly controls the z-section of xyz-drive 3. Accordingly, with decreasing distance between sample 4 and point 5, the interatomic force increases and deflects cantilever 7' which in turn causes the tunnel gap to become smaller and, hence, the tunnel current to increase. In the feedback arrangement of this mode, the increasing tunnel current operates to retract sample 4 and, thus, decrease the interatomic force, and so forth.

For certain applications, it may be convenient to feed back some percentage of the control signal derived from the tunnel current variation to the z-drive 9 to directly contribute to the controlling of the tunneling microscope. Toward this end, a controller 36 (FIG. 3) is interposed between converter 27 and the z-drive 9 to generate in additional correction signal. In this case, sample 4 and tunnel tip 8 are driven in opposite directions—tunnel tip 8, however, a factor 10, 100 or 1000, for example, less in amplitude. The attention of the practitioners of this invention should be drawn to the fact that in contrast to the above-described first through third feedback modes, in the fourth mode the absolute value of the interatomic force is only well defined at the beginning of the measurement when a certain deflection of cantilever 7 is adjusted. After a while, the deflection may become undefined because of thermal drift.

As mentioned above, sample 4 is supported on xyz-drive 3, the z-section being used to fine-adjust the distance between sample 4 and point 5. The xy-sections of xyz-drive 3 are used for displacing sample 4 in its xy-plane with respect to point 5. The displacement is controlled so that point 5 performs a raster scan of the surface of sample 4. The raster scan signal is, hence, representative of the position, in the xy-plane, of point 5 over sample 4.

In an embodiment in accordance with FIG. 2 operated under the conditions of feedback mode four, a vertical resolution of 0.1 nanometer and a lateral resolution of 3 nanometers was achieved, although the measurement was conducted in air. It should be noted that in air all surfaces tend to be covered with a thin film of water, and this might require a certain minimum force for point 5 to be able to transit that wafer film.

So that the roughness of the sample 4 can not only be scanned but also recorded, the apparatus embodying the invention preferably includes a plotter 38 (FIG. 3). Plotter 37 provides a plot of the aforementioned raster scan signal versus the aforementioned feedback or correction signal to yield an image of the topography of the surface of sample 4. More specifically, plotter 37 receives its x and y inputs from the x and y outputs, respectively, of controller 33 to xyz-drive 3. The z input of plotter 37 is derived from the output of controller 36 which via z-drive 9 is also responsible for maintaining the distance between cantilever 7 and tunnel tip 8 essentially constant. As sample 4 is moved by xyz-drive 3 so that point 5 scans the surface of the sample along, e.g. cartesian coordinates, the stylus of plotter 37 is moved correspondingly (but at enormously enlarged scale), with the z input superpositioned over the y-coordinate signal.

In other words, as point 5 scans the surface of sample in the x-direction at a fixed y-value, the roughness of the surface of sample will cause the sample-to-surface distance to vary and thus cause the atomic forces between the sample and surface to vary and cause spring 7 to be deflected. As spring 7 deflects, the tunneling distance between the spring and tip 8 changes; preferably for each 0.1 nanometer of change of that distance, the tunneling current changes by one order of magnitude. This change is measured by converter 27. The output signal of converter 7, either via controller 36, controls z-drive 9 to cause tunnel tip 8 to return to the position it had prior to the change; or, via controller 28, controls the z-section of xyz-drive 3 to cause sample 4 to move back to the position it had prior to the deflection of spring 7.

The feedback output signal of controller 36 is used to control the movement of the stylus of plotter 37 in the y-direction as an addition to the fixed y-value which corresponds to the position of point 5 over the surface of sample 4. Two of the dimensions, x and z, can easily be shown on plotter 37. By portraying the measured values of x and z as a set of curves x(z) plotted as a function of the parameter y, the third dimension, y, can be represented.

By repeating this process for all values of the y-coordinate, a virtually three-dimensional image of the surface scanned will be created.

Additional explanation, if desired, is contained in U.S. Pat. No. 4,343,993, the description of which is hereby incorporated by reference, especially that portion thereof from column 5 , line 55 through column 6, line 9.

It will be understood that, if preferred, a viewing screen (not shown) may be used in place of plotter 37. Also, by placing the atomic force microscope of the present invention in an ultra-high vacuum environment, the stability and resolving power of the instrument will be dramatically improved.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A method for generating a topographical image of a surface of a sample with a resolution better than 100 nm, comprising the steps of:

moving a sharp point (5) which is fixed to one end of a spring-like cantilever (7) toward the surface of the sample (4) to be inspected to a distance where the forces occurring between the atoms at the apex of said point (5) and on the sample's surface are larger than $10^{-20}$N and the resulting force deflects said cantilever (7);

detecting the deflection of said cantilever (7) by means of a tunnel tip (8) disposed adjacent said cantilever (7);

maintaining the tunnel current flowing across the tunnel gap between said cantilever (7) and said tunnel tip (8) at a substantially constant preselected value by using any detected variations of the tunnel current from said preselected value to generate a correction signal;

using said correction signal to maintain the point-to-sample distance substantially constant; and moving the sample relative to said point (5).

2. The method in accordance with claim 1, comprising the further steps of:

generating a series of successive position signals (via 33), each indicative of the then current position of the point (5) relative to the sample (4), and using changes in the correction signal in conjunction with the position signals to generate (via 37) a human readable topographical image of the surface of the sample.

3. The method in accordance with claim 1, wherein during the detecting step the sample (4) is oscillated in z-direction by appropriately modulating the xyz-drive (3) on which the sample is held, at the eigen frequency of said cantilever (7) and with an amplitude between 0.1 and 1 nanometer, for causing the cantilever (7) to oscillate and thus modulate the tunnel current.

4. The method in accordance with claim 1, wherein during the detecting step said cantilever (7) is excited to oscillate in z-direction at an amplitude in the 0.01 . . . 0.1 nanometer range, and including the further step of deriving an additional correction signal from the changes in amplitude occurring as the sample (4) is scanned.

5. The method in accordance with claim 1, including the step of exciting said cantilever (7) to oscillate in z-direction at an amplitude in the 0.01 . . . 0.1 nanometer range, and deriving an additional correction signal from changes in the phase of the cantilever's oscillation occurring as the sample (4) is scanned.

6. The method in accordance with claim 1, including the steps of:

feeding back one predetermined percentage of said correction signal to the control mechanism (9) for the tunnel tip (8); and applying another predetermined percentage of said correction signal to the control mechanism (3) for the sample holder (3) for driving the sample (4) and the tunnel tip (8) in opposite directions for correction of such distance.

7. An atomic force microscope for evaluating the surface of a sample (4), said microscope comprising:

means including first and second tunnel electrodes and associated electronics for measuring the distance between said tunnel electrodes and for generating a correction signal in response to deviations of said distance from a predetermined value;

said first tunnel electrode including a cantilever (7) having at one end thereof a pint (5) adjacent which the sample surface is disposed;

said second tunnel electrode (8) being disposed adjacent and spaced distance from said first tunnel electrode (7);

means (9) for moving said second electrode relative to said first electrode;

means responsive to said correction signal for maintaining the distance between the sample and point constant; and means for moving the sample relative to said point.

8. A microscope in accordance with claim 7, including:

means (33) for generating a series of successive position signals, each indicative of the then current position of the point (5) relative to the sample (4), and means (37) responsive to the correction signal and position signals to generate a human readable topographical image of the surface of the sample.

9. A microscope in accordance with claim 7, wherein said point (5) consists of a diamond needle attached to said cantilever (7).

10. A microscope in accordance with claim 7, wherein said cantilever (7) is fixed to apart (6) of a base (1) and a piezoelectric element (13) is arranged between said cantilever (7) and said part (6).

11. A microscope in accordance with claim 7, wherein said sample holder (3) is supported by a base (1, 2) by means of vibration damping means (11,17).

12. A microscope in accordance with claim 11, wherein the sample holder (3) is attached to a supporting member (16) which in turn is fixed to said vibration damping means (17), and means (14) is provided for coarse adjustment of said sample (4) with respect to said point (5) in z-direction, for moving said supporting member (16) against the resistance of said vibration means (17).

13. A microscope in accordance with claim 7, wherein said cantilever (7) has one end rigidly connected to a common base (1), supporting means (16,20) respectively supporting an xyz-drive and sample holder (3) and a z-drive and tunnel tip support (9), and vibration damping means (17, 19) carried by said base interposed between said base and supporting means.

14. A microscope in accordance with claim 7, wherein said cantilever (7) is electrically conductive on its side facing said tunnel tip (8), and an electrical potential difference is maintained between said tunnel tip (8) and the side of the cantilever (7) which it faces.

15. A microscope in accordance with claim 7, wherein said cantilever (7) consists of a gold foil of about 25 micrometer thickness.

16. A method for generating a topographical image of a surface of a sample with a resolution better than 100 nm, comprising the following steps:

moving a point (5) which is fixed to the free end of a spring-like cantilever (7) toward the surface of the sample (4) to be inspected to a distance where the forces occurring between the atoms at the apex of said point (5) and on the sample's surface ar larger than $10^{-20}$N and the resulting force deflects said cantilever (7);

detecting the deflection of said cantilever (7) by means of a detector (8) which is disposed adjacent said free end of said cantilever (7) and provides an output signal indicative of the distance between the cantilever (7) and said sample (4);

using variations in the output signal of the detector (8) to generate a correction signal;

maintaining said distance substantially at a constant value by using said correction signal in a servo-like system; and moving the sample relative to said point (5).

17. The method in accordance with claim 16, comprising the further steps of:

generating a series of successive position signals (via 33), each indicative of the then current position of the point (5) relative to the sample (4), and using changes in the correction signal in conjunction with the position signals to generate (via 37) a human readable topographical image of the surface of the sample.

*18. A method for examining a surface of a sample, comprising the following steps:*

*providing relative motion in a z direction between a point on a deflectable cantilever of an atomic force microscope and a surface of said sample to be inspected, said point and said surface being brought sufficiently close that the interatomic force between atoms at the apex of said point and at a first area on said sample surface cause a deflection of said cantilever;*

*detecting and using the deflection of said cantilever to produce a signal indicative of a property of said area of said sample;*

*producing relative lateral motion between said sample and said point to scan said point with respect to said sample surface; and*

*detecting and using the deflection of said cantilever when it is scanned across said sample surface to produce further signals indicative of a property of other areas of said sample surface, thereby examining said surface.*

*19. The method of claim 18, where said point and said sample surface are sufficiently close that said force is at least* $10^{-20}$N.

*20. The method of claim 18, where during lateral scanning of said point relative to the surface of said sample, said force is held substantially constant.*

*21. The method of claim 18, where during lateral scanning of said point relative to said sample surface the distance between said point and said sample surface is held substantially constant.*

*22. The method of claim 18 including the further steps of:*

*sensing variations in said signals produced by deflection of said cantilever to generate correction signals, and*

*during lateral scanning of said point relative to said sample surface selectively maintaining said force or the distance between said point and said sample surface substantially constant.*

*23. The method of claim 18, including the further steps of:*

*generating a series of successive position signals indicative of the lateral positions of said point relative to said sample surface; and*

*using said position signals and said signals arising from the deflection of said cantilever to produce a topographical image of said sample surface.*

*24. The method of claim 18, wherein said cantilever is oscillated in the z direction.*

*25. An atomic force microscope for evaluating the surface of sample, comprising:*

*a spring-like cantilever including a pointed tip;*

*a sample holder for holding said sample in a position where said surface faces said pointed tip;*

*first means for producing relative motion in the z direction between said pointed tip and said sample surface to bring said pointed tip and said sample surface sufficiently close that the interatomic force between atoms on said tip and at a first area on said sample surface causes a deflection of said cantilever;*

*second means for producing relative motion in the lateral directions between said pointed tip and said sample surface to scan said pointed tip across other areas on said sample surface; and*

*means including detector means for detecting the deflections of said cantilever during said scanning of said areas to produce signals indicative of a property of said sample surface, thereby evaluating said surface.*

*26. The microscope of claim 25, where said pointed tip and said sample surface are sufficiently close to one another that said force is at least* $10^{-20}$*N.*

*27. The microscope of claim 25, including:*

*correction means for producing correction signals from the outputs of said detector means; and*

*means responsive to said correction means for selectively maintaining substantially constant during said scanning said force or the distance between said pointed tip and said sample surface.*

*28. The microscope of claim 25, further including means for generating position signals indicative of the lateral positions of said pointed tip relative to said sample surface.*

*29. The microscope of claim 25, where said first means includes means for moving said sample in said z direction.*

*30. The microscope of claim 25, further including means for oscillating said cantilever in the z direction.*

*31. An atomic force instrument, comprising:*

*a deflectable member including a pointed tip;*

*means for bringing closely together said pointed tip and a region of a surface, the distance between said tip and said surface being sufficiently small that interatomic forces exist between atoms on said tip and at a first area on said surface of sufficient magnitude to cause a deflection of said deflectable member;*

*means responsive to deflection of said deflectable member to detect changes in a control parameter between said tip and surface;*

*means for producing relative lateral motion between said pointed tip and other areas on said surface; and*

*means responsive to said control parameter during said lateral motion to provide a series of signals indicative of a property of said surface, thereby evaluating said surface.*

* * * * *